(12) United States Patent
Hern et al.

(10) Patent No.: US 11,397,279 B2
(45) Date of Patent: Jul. 26, 2022

(54) COMPARISON OF WELLS USING A DISSIMILARITY MATRIX

(71) Applicant: Chevron U.S.A. Inc., San Ramon, CA (US)

(72) Inventors: Brett M. Hern, Porter, CA (US); Tao Sun, Missouri City, TX (US); Brian J. Willis, Houston, TX (US); Fabien J. Laugier, Houston, TX (US); Ashley D. Harris, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 236 days.

(21) Appl. No.: 16/832,641

(22) Filed: Mar. 27, 2020

(65) Prior Publication Data

US 2021/0302620 A1    Sep. 30, 2021

(51) Int. Cl.
  *G01V 99/00*    (2009.01)
  *E21B 49/00*    (2006.01)
(52) U.S. Cl.
  CPC ............ *G01V 99/005* (2013.01); *E21B 49/00* (2013.01); *E21B 2200/20* (2020.05)
(58) Field of Classification Search
  CPC .... G01V 99/005; E21B 49/00; E21B 2200/20
  See application file for complete search history.

(56) References Cited

U.S. PATENT DOCUMENTS

| | | |
|---|---|---|
| 2,653,220 A | 9/1953 | Bays |
| 7,079,953 B2 | 7/2006 | Thorne |
| 7,516,055 B2 | 4/2009 | Strebelle |
| 7,630,517 B2 | 12/2009 | Mirowski |

(Continued)

FOREIGN PATENT DOCUMENTS

| | | |
|---|---|---|
| CN | 102540256 | 7/2012 |
| CN | 103454678 | 12/2013 |

(Continued)

OTHER PUBLICATIONS

Harris S, Santoshini S, Kashem S, Viard T, Levannier A, Benabbou A. Complex geological modeling and quality assurance using unstructured grids. InAbu Dhabi International Petroleum Exhibition & Conference Nov. 12, 2018. Society of Petroleum Engineers. 20 pages.

(Continued)

Primary Examiner — Mischita L Henson
(74) Attorney, Agent, or Firm — Esplin & Associates, PC

(57) ABSTRACT

Well information may define subsurface configuration of different wells. Marker information defining marker positions within the wells may be obtained. A dissimilarity matrix for the wells may generated, with the element values of the dissimilarity matrix determined based on comparison of corresponding subsurface configuration of the wells. A gated dissimilarity matrix may be generated from the dissimilarity matrix based on the marker positions within the wells. The elements values of the gated dissimilarity matrix corresponding to one set of marker positions and not corresponding to the other set of marker positions may be changed. Correlation between the wells may be determined based on the gated dissimilarity matrix such that correlation exists between a marker position in one well and a marker position in another well.

20 Claims, 8 Drawing Sheets

(56) References Cited

U.S. PATENT DOCUMENTS

| | | | |
|---|---|---|---|
| 7,706,981 B2 | 4/2010 | Wilkinson | |
| 8,271,244 B2 | 9/2012 | Ross | |
| 8,666,149 B2 | 3/2014 | Thorne | |
| 9,187,984 B2 | 11/2015 | Usadi | |
| 9,753,180 B2 | 9/2017 | Suzuki | |
| 9,804,282 B2 | 10/2017 | Xu | |
| 10,036,829 B2 | 7/2018 | Ghayour | |
| 10,190,403 B2 | 1/2019 | Samuel | |
| 10,287,858 B2 | 5/2019 | Ghayour | |
| 10,317,569 B2 | 6/2019 | Sun | |
| 10,319,143 B2 | 6/2019 | Branets | |
| 10,365,261 B2 | 7/2019 | Montgomery | |
| 10,816,440 B2 | 10/2020 | Amendt | |
| 10,984,590 B1 | 4/2021 | Li | |
| 11,010,969 B1 | 5/2021 | Li | |
| 11,320,566 B2 | 5/2022 | Hern | |
| 2002/0013687 A1 | 1/2002 | Ortoleva | |
| 2005/0180261 A1 | 8/2005 | Mandal | |
| 2006/0041409 A1 | 2/2006 | Strebelle | |
| 2006/0052938 A1 | 3/2006 | Thorne | |
| 2006/0136162 A1 | 6/2006 | Hamman | |
| 2007/0100593 A1 | 5/2007 | Deffenbaugh | |
| 2007/0219724 A1 | 9/2007 | Li | |
| 2008/0015784 A1 | 1/2008 | Dorn | |
| 2009/0262603 A1 | 10/2009 | Hurley | |
| 2009/0306945 A1 | 12/2009 | Wu | |
| 2009/0319243 A1 | 12/2009 | Suarez-Rivera | |
| 2010/0004864 A1* | 1/2010 | Thorne | G01V 11/00 702/6 |
| 2010/0149917 A1 | 6/2010 | Imhof | |
| 2010/0332205 A1 | 12/2010 | Tillier | |
| 2011/0002194 A1 | 1/2011 | Imhof | |
| 2011/0054857 A1 | 3/2011 | Moguchaya | |
| 2011/0054869 A1* | 3/2011 | Li | G06F 30/20 703/10 |
| 2011/0213600 A1 | 9/2011 | Strebelle | |
| 2011/0231164 A1 | 9/2011 | Zhang | |
| 2011/0240310 A1 | 10/2011 | Sun | |
| 2011/0264430 A1 | 10/2011 | Tapscott | |
| 2011/0272161 A1 | 11/2011 | Kumaran | |
| 2012/0029828 A1 | 2/2012 | Pepper | |
| 2012/0215628 A1 | 8/2012 | Williams | |
| 2012/0221302 A1 | 8/2012 | Lewandowski | |
| 2012/0221306 A1 | 8/2012 | Hurley | |
| 2013/0046524 A1 | 2/2013 | Gathogo | |
| 2013/0064040 A1 | 3/2013 | Imhof | |
| 2013/0118736 A1 | 5/2013 | Usadi | |
| 2013/0151161 A1 | 6/2013 | Imhof | |
| 2013/0179080 A1 | 7/2013 | Skalinski | |
| 2013/0246031 A1 | 9/2013 | Wu | |
| 2013/0294197 A1 | 11/2013 | Vallikkat Thachaparambil | |
| 2013/0318141 A1 | 11/2013 | Maucec | |
| 2013/0329986 A1 | 12/2013 | Strebelle | |
| 2014/0035912 A1 | 2/2014 | Julian | |
| 2014/0316706 A1 | 10/2014 | Grant | |
| 2014/0358440 A1 | 12/2014 | Pyrcz | |
| 2015/0066460 A1 | 3/2015 | Klinger | |
| 2015/0088424 A1* | 3/2015 | Burlakov | G01V 99/00 702/6 |
| 2015/0112656 A1 | 4/2015 | Rodriguez-Herrera | |
| 2015/0205001 A1 | 7/2015 | Carruthers | |
| 2015/0212231 A1 | 7/2015 | Borouchaki | |
| 2015/0219793 A1 | 8/2015 | Li | |
| 2015/0241591 A1 | 8/2015 | Burmester | |
| 2015/0309197 A1 | 10/2015 | Dimitrov | |
| 2016/0041279 A1 | 2/2016 | Casey | |
| 2016/0048933 A1 | 2/2016 | Strebelle | |
| 2016/0103245 A1 | 4/2016 | Pyrcz | |
| 2016/0139299 A1 | 5/2016 | Leger | |
| 2016/0313463 A1 | 10/2016 | Wahrmund | |
| 2016/0342718 A1 | 11/2016 | Moyner | |
| 2017/0011149 A1 | 1/2017 | Liu | |
| 2017/0153343 A1 | 6/2017 | Almarhoon | |
| 2017/0205531 A1 | 7/2017 | Berard | |
| 2017/0227451 A1 | 8/2017 | Hoegerl | |
| 2018/0003839 A1 | 1/2018 | Lowell | |
| 2018/0217283 A1 | 8/2018 | Klinger | |
| 2018/0225778 A1 | 8/2018 | Grant | |
| 2018/0334902 A1 | 11/2018 | Olsen | |
| 2019/0026405 A1 | 1/2019 | Ramsay | |
| 2019/0094414 A1 | 3/2019 | Prochnow | |
| 2019/0243028 A1 | 8/2019 | Von Gonten | |
| 2020/0380390 A1 | 12/2020 | Sun | |
| 2021/0048556 A1 | 2/2021 | Sun | |
| 2021/0173117 A1 | 6/2021 | Laugier | |
| 2021/0222523 A1 | 7/2021 | Sun | |
| 2021/0223431 A1* | 7/2021 | Hern | G06V 10/751 |
| 2021/0341642 A1 | 11/2021 | Harris | |

FOREIGN PATENT DOCUMENTS

| | | |
|---|---|---|
| CN | 103454686 | 12/2013 |
| CN | 104111473 | 10/2014 |
| CN | 105372705 | 3/2016 |
| CN | 105717542 | 6/2016 |
| CN | 105954802 | 9/2016 |
| CN | 107942382 | 4/2018 |
| CN | 107976713 | 5/2018 |
| EP | 2917770 | 9/2015 |
| FR | 3039679 | 2/2017 |
| GB | 2474740 | 4/2011 |
| WO | 2017019718 | 2/2017 |
| WO | 2018017108 A1 | 1/2018 |
| WO | 2018208634 | 11/2018 |

OTHER PUBLICATIONS

Rubio, R.H., Koppe, V.C., Costa, J.F.C.L. and Cherchenevski, P.K., 2015. How the use of stratigraphic coordinates improves grade estimation. Rem: Revista Escola de Minas, 68(4), pp. 471-477.

Santoshini S, Harris S, Kashem S, Levannier A, Benabbou A, Viard T, Mace L. Depogrid: Next Generation Unstructured Grids for Accurate Reservoir Modeling and Simulation. InSPE Russian Petroleum Technology Conference Oct. 15, 2018. Society of Petroleum Engineers. 20 pages.

Bertoncello, Antoine, Caers, Jef, Biver, Pierre, CaumonGuillaume, (2008). Geostatistics on Stratigraphic Grid. ERE department / Stanford University (pp. 1-16).

Efros, A. A., & Freeman, W. T. (2001). Image quilting for texture synthesis and transfer. Proceedings of the 28th Annual Conference on Computer Graphics and Interactive Techniques—SIGGRAPH '01, 341-346. https://doi.org/10.1145/383259.383296.

Hoffimann, J., Scheidt, C., Barfod, A., & Caers, J. (2017). Stochastic simulation by image quilting of process-based geological models. Computers and Geosciences, 106(February), 18-32. https://doi.org/10.1016/j.cageo.2017.05.012.

Mahmud, K., Mariethoz, G., Caers, J., Tahmasebi, P., & Baker, A. (2014). Simulation of Earth textures by conditional image quilting. Water Resources Research, 50(4), 3088-3107. https://doi.org/10.1002/2013WR015069.

Mariethoz, G., Renard, P., & Straubhaar, J. (2010). The direct sampling method to perform multiple-point geostatistical simulations. Water Resources Research, 46(11). https://doi.org/10.1029/2008WR007621 (14 pages).

Hawie, Nicolas, Jacob Covault, Dallas Dunlap, and Zoltan Sylvester 2017. "Slope-fan Depositional Architecture from High-resolution Forward Stratigraphic Models". EarthArXiv. Dec. 19. eartharxiv.org/f9dkp. (36 pages).

Yupeng, Li, and Wu Shenghe. "Hierarchical nested simulation approach in reservoir architecture modeling." Petroleum Exploration and Development 40, No. 5 (2013): 676-681.

Sacchi, Quinto, Eloisa Salina Borello, Gert Jan Weltje, and Rory Dalman. "Increasing the predictive power of geostatistical reservoir models by integration of geological constraints from stratigraphic forward modeling." Marine and Petroleum Geology 69 (2016): 112-126.

One Petro Search Results, Jun. 15, 2021, 8 pp. (Year: 2021).

Scheevel et al., Principal Component Analysis Applied to 3D Seismic Data for Reservoir Property Estimation, Feb. 1, 2001, SPE Reservoir Evaluation & Engineering 4 (01), pp. 64-72 (Year: 2001).

(56) References Cited

OTHER PUBLICATIONS

Ana-Maria Ilisei et al., Automatic Classification of Subsurface Features in Radar Sounder Data Acquired in Icy Areas, 2013, IEEE, pp. 3530-3533 (Year: 2013).
Liu et al. "Visual Analytics of Stratigraphic Correlation for Multi-attribute Well-logging Data Exploration." Jul. 2019 IEEE Access PP(99):1-1, Jul. 16, 2019, [online] [retrieved on Oct. 5, 2020 (Oct. 5, 2020)) Retrieved from the Internet< URL: https://ieeexplore.ieee.org/document/8764395>. entire document (13 pages).
PCT International Search Report and Written Opinion, International Application No. PCT/US20/44874, dated Dec. 17, 2020. (8 pages).
PCT International Search Report and Written Opinion, International Application No. PCT/US20/61212, dated Dec. 21, 2020. (7 pages).
PCT International Search Report and Written Opinion for Application No. PCT/US21/23008, dated Jun. 8, 2021 (8 pages).
PCT International Search Report and Written Opinion, International Application No. PCT/US20/31869, dated Aug. 4, 2020. 2 pages.
Ou et al. "Fine reservoir structure modeling based upon 3D visualized stratigraphic correlation between horizontal wells: methodology and its application" Journal of Geophysics and Engineering J. Geophys Eng. 14 (2017) 1557-1571 (15pp). (Year: 2017).
PCT International Search Report and Written Opinion, International Application No. PCT/US2020/61489, dated Jan. 28, 2021 (7 pages).
PCT International Search Report and Written Opinion, International Application No. PCT/US2020/61323, dated Feb. 19, 2021 (8 pages).
PCT International Search Report and Written Opinion, International Application No. PCT/US21/12733, dated Mar. 23, 2021 (11 pages).
Tahmasebi et al. Multiple-point geostatistical modeling based on the cross-correlation 1-15 functions. Mar. 8, 2012 (Mar. 8, 2012). [retrieved on Mar. 5, 2021]. Retrieved from the Internet: <URL: http:/lwww.uwyo.edu/pejman/_files/docs/tahmasebi_ccsim.pdf> pp. 779-796.
Zhou et al. A Stratigraphic Prediction Method Based on Machine Learning. Aug. 29, 2019 1-15 (Aug. 29, 2019). (retrieved on Mar. 5, 2021]. Retrieved from the Internet: <URL: https://www.mdpi.com/2076-3417/9/17/3553/pdf> pp. 1-29.
Zhou et al. A Stratigraphic Prediction Method Based on Machine Learning. Aug. 29, 2019 (Aug. 29, 2019). [retrieved on Mar. 5, 2021]. Retrieved from the Internet: <URL: https://www.mdpi.com/2076-3417/9/17/3553/pdf> pp. 1-29.
Amaru, Maisha, Tao Sun, Lisa Goggin, and Ashley Harris. "Integration of computational stratigraphy models and seismic data for subsurface characterization." The Leading Edge 36, No. 11 (2017): 947a1-947a6 (Year: 2017).
Chandra, Viswasanthi, Patrick William Michael Corbett, Sebastian Geiger, and Hamidreza Hamdi. Improving reservoir characterization and simulation with near-wellbore modeling. SPE Reservoir Evaluation & Engineering 16, No. 02 (2013): 183-193 (Year: 2013).
Dalman, Rory AF, and Gert Jan Weltje. SimClast: An aggregated forward stratigraphic model of continental shelves. Computers & geosciences 38, No. 1 (2012): 115-126 (Year: 2012).
Hantschel, Thomas, and Armin I. Kauerauf. Fundamentals of basin and petroleum systems modeling. Section 8.9. Springer Science & Business Media, 2009, pp. 399-404 (Year: 2009).
Hawie, N., M. Callies, and E. Marfisi. "Integrated Multi-Disciplinary Forward Stratigraphic Modelling Workflow in Petroleum Systems Assessment." In SPE Middle East Oil & Gas Show and Conference OnePetro, 2017. 8 pages (Year: 2017).
Michelena, Reinaldo J. et al., "Similarity Analysis: A New Tool to Summarize Seismic Attributes Information", Apr. 1998, TheLeading Edge. (Year: 1998).
PCT International Search Report and Written Opnion for Application No. PCT/US21/29956, dated Aug. 2, 2021 (7 pages).
Weltje, Gert Jan, Rory Dalman, Pantelis Karamitopoulos, and Quinto Sacchi. "Reducing the uncertainty ofstatic reservoir models: implementation of basin-scale geological constraints." In EAGE Annual Conference & Exhibitionincorporating SPE Europec. OnePetro, 2013 (Year: 2013).
Bourdarot, Gilles, Hocine Khemissa, Abdullah Al Shemsi, Bruno Murat, Remy Richet, Federico Games, and Florent Porcher. "Sedimentology Genetic Modeling of an Offshore Abu Dhabi Carbonate Reservoir." In Abu Dhabi International Petroleum Exhibition and Conference. OnePetro, 2014 (Year: 2014).
Slomka, J. M., K. E. MacCormack, and C. H. Eyles. Preservation of local high-resolution data in a regional low-resolution dataset: a 'nested'3D modeling approach using an example from a Quaternary glacial stratigraphy (Ontario, Canada). Engineering Geology 248 (2019): 309-329 (Year: 2019).

\* cited by examiner

COMPARISON OF WELLS USING A DISSIMILARITY MATRIX

FIELD

The present disclosure relates generally to the field of comparing wells using a dissimilarity matrix.

BACKGROUND

Correlation of different wells using well logs and/or well cores may provide insights on whether and/or how different segments of the wells are linked together. Lithostratigraphic correlations of wells may result in erroneous representations of the spatial distributions of rock properties and/or internal structure of a reservoir.

SUMMARY

This disclosure relates to comparing wells. First well information, second well information, first well marker information, second well marker information, and/or other information may be obtained. The first well information may define subsurface configuration of a first well. The first well information may include a first set of values that define the subsurface configuration at a first set of positions within the first well. The second well information may define the subsurface configuration of a second well. The second well information may include a second set of values that define the subsurface configuration at a second set of positions within the second well. The first well marker information may define a first set of marker positions within the first well. The second well marker information may define a second set of marker positions within the second well.

A dissimilarity matrix for the first well and the second well may be generated. A dimension of the dissimilarity matrix may be defined by a first number of positions within the first set of positions and a second number of positions within the second set of positions. Element values of the dissimilarity matrix may be determined based on comparison of the subsurface configuration of the first well at corresponding positions within the first well and the subsurface configuration of the second well at corresponding positions within second first well, and/or other information. A gated dissimilarity matrix may be generated from the dissimilarity matrix based on the first set of marker positions within the first well, the second set of marker positions within the second well, and/or other information. The element values of the dissimilarity matrix corresponding to the first set of marker positions and not corresponding to the second set of marker positions within the second well may be changed relative to other element values in the gated dissimilarity matrix. Correlation between one or more marker positions within the first well and one or more marker positions within the second well may be determined based on the gated dissimilarity matrix and/or other information.

A system that compares wells may include one or more electronic storage, one or more processors and/or other components. The electronic storage may store well information, information relating to well, information relating to subsurface configuration of well, information relating to positions within well, well-marker information, information relating to marker positions within well, information relating to dissimilarity matrix, information relating to gated dissimilarity matrix, information relating to correlation between wells, information relating to correlation between marker positions within wells, and/or other information.

The processor(s) may be configured by machine-readable instructions. Executing the machine-readable instructions may cause the processor(s) to facilitate comparing wells. The machine-readable instructions may include one or more computer program components. The computer program components may include one or more of a well information component, a well marker information component, a dissimilarity matrix component, a gated dissimilarity matrix component, a correlation component, and/or other computer program components.

The well information component may be configured to obtain well information for multiple wells. The well information for a well may define subsurface configuration of the well. The well information for a well may include a set of values that define the subsurface configuration of the well at a set of positions within the well. For example, the well information component may be configured to obtain first well information, second well information, and/or other well information. The first well information may define subsurface configuration of a first well. The first well information may include a set of values that define the subsurface configuration of the first well at a set of positions within the first well. The second well information may define subsurface configuration of a second well. The second well information may include a set of values that define the subsurface configuration of the second well at a set of positions within the second well.

In some implementations, at least one of the first well and the second well may be a natural well. In some implementations, at least one of the first well and the second well may be a virtual well.

The well marker information component may be configured to obtain well marker information for multiple wells. The well marker information for a well may define a set of marker positions within the well. For example, the well marker information component may be configured to obtain first well marker information, second well marker information, and/or other well marker information. The first well marker information may define a set of marker positions within the first well. The second well marker information may define a set of marker positions within the second well.

The dissimilarity matrix component may be configured to generate a dissimilarity matrix for multiple wells. For example, the matrix component may be configured to generate a dissimilarity matrix for the first well and the second well. A dimension of the dissimilarity matrix may be defined by a number of positions within the set of positions within the first well and a number of positions within the set of positions within the second well. Element values of the dissimilarity matrix may be determined based on comparison of the subsurface configuration of the first well at corresponding positions within the first well and the subsurface configuration of the second well at corresponding positions within second first well, and/or other information.

In some implementations, the element values of the dissimilarity matrix may be determined based on the comparison to be greater than or equal to zero. Greater element values may reflect greater dissimilarity between the subsurface configuration of the wells at corresponding position within the wells.

The gated dissimilarity matrix component may be configured to generate a gated dissimilarity matrix from a dissimilarity matrix. The gated dissimilarity matrix may be generated based on the set of marker positions within different wells, and/or other information. For example, the gated dissimilarity matrix for the first well and the second well may be generated based on the set of marker positions within the first well, the set of marker positions within the second well, and/or other information. The element values of the dissimilarity matrix corresponding to the set of marker positions within one well (e.g., the first well) and not corresponding to the set of marker positions within the other well (e.g., the second well) may be changed relative to other element values in the gated dissimilarity matrix.

The correlation component may be configured to determine correlation between different wells based on the gated dissimilarity matrix and/or other information. The correlation determined between different wells may include correlation between marker positions within the different wells. For example, the correlation component may be configured to determine correlation between the first well and the second well based on the gated dissimilarity matrix for the first well and the second well, and/or other information. The correlation component may be configured to determine correlation between one or more marker positions within the first well and one or more marker positions within the second well based on the gated dissimilarity matrix for the first well and the second well, and/or other information.

In some implementations, determination of the correlation between the marker position(s) within the first well and the marker position(s) within the second well based on the gated dissimilarity matrix may include generation of a path within the gated dissimilarity matrix. The path may be generated based on a directed walk within the gated dissimilarity matrix and/or other information. The element values corresponding to the set of marker positions within one well (e.g., the first well) and not corresponding to the set of marker positions within the other well (e.g., the second well) may be changed relative to the other element values to obstruct traversal of the path through corresponding elements of the gated dissimilarity matrix.

In some implementations, the path may include a minimum-cost path. In some implementations, the path may represent a scenario of correlation between positions within the different wells. For example, the path may represent a scenario of correlation between position within first well and positions within the second well.

In some implementations, the element values corresponding to the set of marker positions within one well (e.g., the first well) and not corresponding to the set of marker positions within the other well (e.g., the second well) may be changed relative to the other element values by increasing the element values to infinity. In some implementations, the element values corresponding to the set of marker positions within one well (e.g., the first well) and corresponding to the set of marker positions within the other well (e.g., the second well) may be preserved to allow traversal of the path.

In some implementations, the element values corresponding to the set of marker positions within one well (e.g., the first well) and not corresponding to the set of marker positions within the other well (e.g., the second well) may be indirectly changed relative to other element values by changing the other element values.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

The present disclosure relates to comparing wells. Well information may define subsurface configuration of different wells. Marker information defining marker positions within the wells may be obtained. A dissimilarity matrix for the wells may generated, with the element values of the dissimilarity matrix determined based on comparison of corresponding subsurface configuration of the wells. A gated dissimilarity matrix may be generated from the dissimilarity matrix based on the marker positions within the wells. The elements values of the gated dissimilarity matrix corresponding to one set of marker positions and not corresponding to the other set of marker positions may be changed. Correlation between the wells may be determined based on the gated dissimilarity matrix such that correlation exists between a marker position in one well and a marker position in another well.

Figure 1:
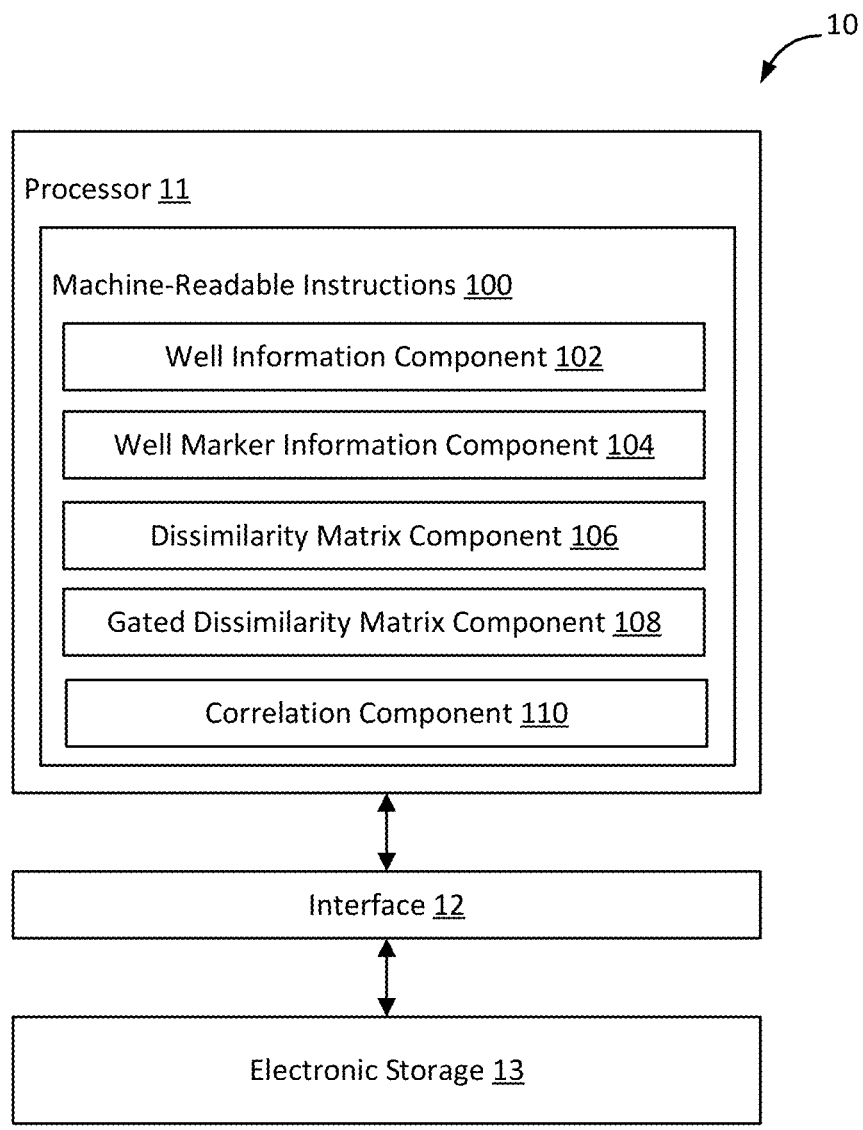
FIG. 1 illustrates an example system that compares wells.

The methods and systems of the present disclosure may be implemented by and/or in a computing system, such as a system 10 shown in FIG. 1. The system 10 may include one or more of a processor 11, an interface 12 (e.g., bus, wireless interface), an electronic storage 13, and/or other components. First well information, second well information, first well marker information, second well marker information, and/or other information may be obtained by the processor 11. The first well information may define subsurface configuration of a first well. The first well information may include a first set of values that define the subsurface configuration at a first set of positions within the first well. The second well information may define the subsurface configuration of a second well. The second well information may include a second set of values that define the subsurface configuration at a second set of positions within the second well. The first well marker information may define a first set of marker positions within the first well. The second well marker information may define a second set of marker positions within the second well.

A dissimilarity matrix for the first well and the second well may be generated by the processor 11. A dimension of the dissimilarity matrix may be defined by a first number of positions within the first set of positions and a second number of positions within the second set of positions. Element values of the dissimilarity matrix may be determined by the processor 11 based on comparison of the subsurface configuration of the first well at corresponding positions within the first well and the subsurface configuration of the second well at corresponding positions within second first well, and/or other information. A gated dissimilarity matrix may be generated by the processor 11 from the dissimilarity matrix based on the first set of marker positions within the first well, the second set of marker positions within the second well, and/or other information. The element values of the dissimilarity matrix corresponding to the first set of marker positions and not corresponding to the second set of marker positions within the second well may be changed relative to other element values in the gated dissimilarity matrix. Correlation between one or more marker positions within the first well and one or more marker positions within the second well may be determined by the processor 11 based on the gated dissimilarity matrix and/or other information.

A well may refer to a hole or a tunnel in the ground. A well may be drilled in the ground for exploration and/or recovery of natural resources in the ground. For example, a well may be drilled in the ground to aid in extraction of petrochemical fluid (e.g., oil, gas, petroleum, fossil fuel). A well may be drilled in one or more directions. For example, a well may include a vertical well, a horizontal well, a deviated well, and/or other type of well.

A well may expose and/or run through different types of materials (e.g., sedimentary rocks) in the ground. The materials in the ground may be grouped into related packages. For example, rocks in the ground may be grouped into packages of rocks that are bounded by chronostratigraphic surface and/or sequence stratigraphic boundaries. Rocks may be related based on their depositions by the same flow and/or sediment transport event. Because the flow and the associated sediment transport are highly correlated spatially, the spatial distribution and spatial variabilities of the sedimentary rocks that are produced by the flow and sediment transport may be predicted.

Geologic analysis and/or reservoir characterization workflow may include determining correlations between segments of different wells. A segment of a well may refer to a part of the well (e.g., a vertical part of the well). A segment of a well may include and/or be defined by one or more materials within a part of the well (e.g., sedimentary rock within a part of the well). A segment of a well may include and/or be defined by one or more materials surrounding a part of the well (e.g., sedimentary rock surrounding a part of the well). A correlation between segments of wells may refer to connection, correspondence, and/or relationship between a segment of one well to a segment of another well. A segment of one well correlated to a segment of another well may indicate that the two segments were deposited at the same time (chronostratigraphically) and/or have similar/related characteristics.

Correlation of wells may be determined lithostratigraphically. Lithostratigraphic correlation of wells may include correlation of wells based solely on their physical and/or petrographic features. Lithostratigraphic correlation of wells may include correlation of wells that maximize cross correlations between pairs of log signals. That is, lithostratigraphic correlation may correlate wells by looking for similar patterns in the pairs of log signals. For example, segments of different wells may be linked together based on similarity of geo-patterns within the segments. However, such correlation of well segments may erroneously represent spatial distributions of rock properties and/or reservoir internal heterogeneity.

Figure 3A:
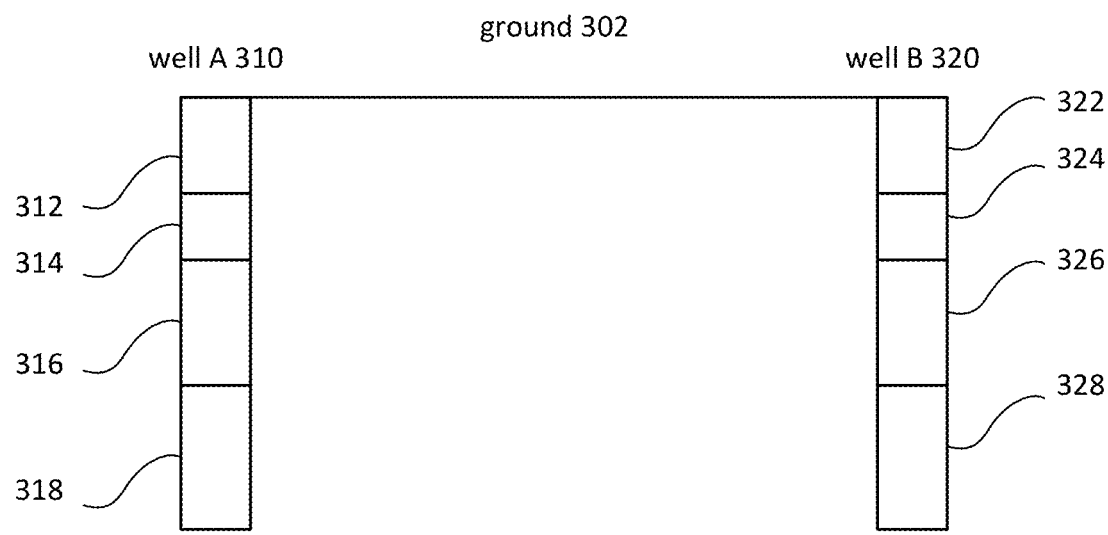
FIGS. 3A-3D illustrate example segments of two wells.
Figure 3B:
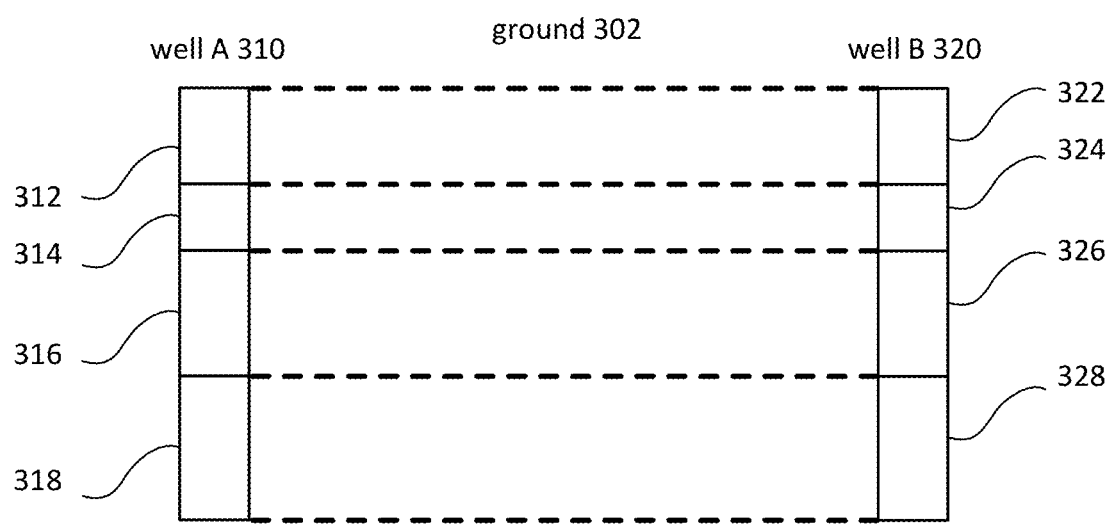

For example, FIGS. 3A-3D illustrate example segments of a well A 310 and a well B 320 drilled into ground 302. The segments of the well A 310 and the well B 320 may include division of the well A 310 and the well B 320 into related packages. The well A 310 may include segments 312, 314, 316, 318, and the well B 320 may include segments 322, 324, 326, 328. As shown in FIG. 3B, lithostratigraphic correlation of segments of wells A 310 and well B 320 may result in linking of the segment 312 to the segment 322, linking of the segment 314 to the segment 324, linking of the segment 316 to the segment 326, and the linking of the segment 318 to the segment 328. Such linking of well segments may result in a railway track style of correlation where the rock packages in the well A 310 is linked to similar rock packages in the well B 320, which may imply that the linked well segments are connected.

Figure 3C:
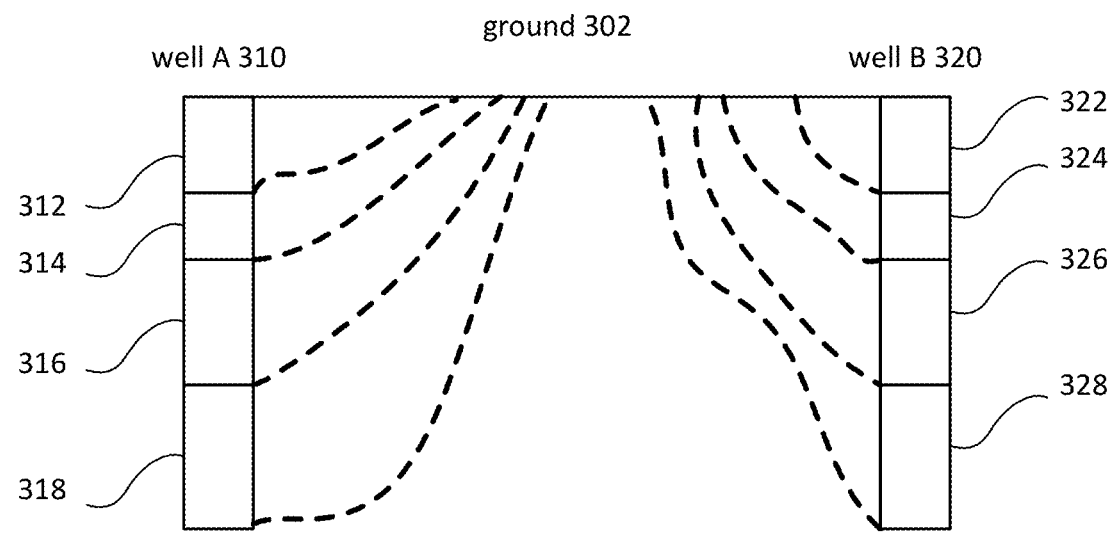
Figure 3D:
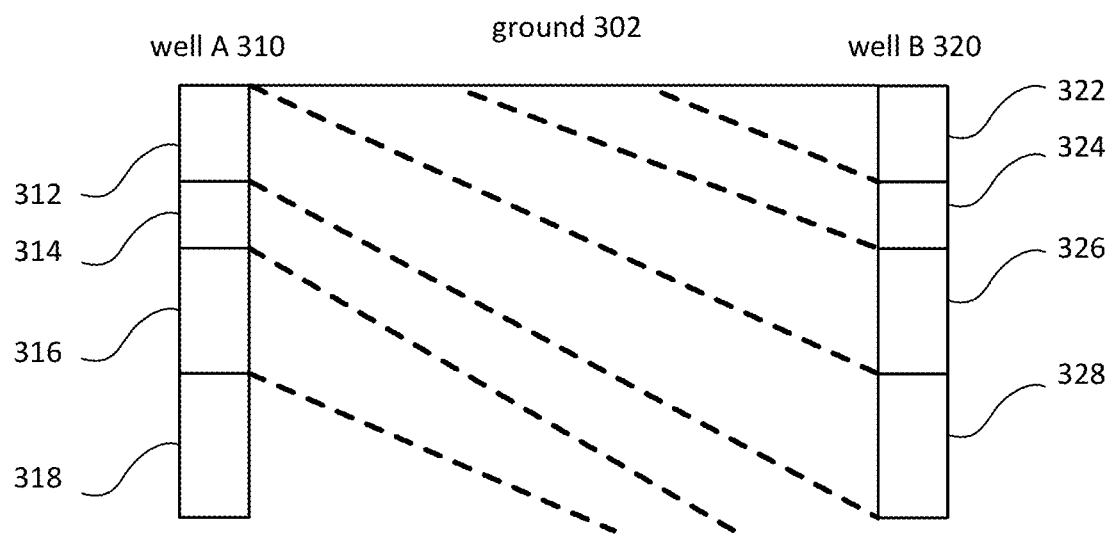

Such representation of spatial distributions of rock properties and/or reservoir internal heterogeneity may not be correct. For example, FIGS. 3C and 3D illustrate alternative spatial distributions of rock properties and/or reservoir internal heterogeneity between the well A 310 and the well B 320. In FIG. 3C, the well A 310 and the well B 320 may be drilled into the ground with similar properties/characteristics (e.g., delta lobes of a delta plain). However, the well A 310 and the well B 320 may be physically separated (e.g., separated by fringing parts of the delta lobes) and the segments 312, 314, 316, 318 of the well A 310 may not be connected to the segments 322, 324, 326, 328 of the well B 320. In FIG. 3D, the well A 310 and the well B 320 may be drilled into the ground with deposited layers being slanted with respect to the ground 302. The segment 312 of the well A 310 may correlate to the segment 328 of the well B 320 (rather than the segment 322). The segments 322, 324, 326 of the well B 310 may not correlate to any segments of the well A 310. The segments 314, 316, 318 of the well A 310 may or may not correlate to segments of the well B 320 below the segment 328.

An important advancement in geological studies is the development of chrono- and sequence stratigraphy. Chrono- and sequence stratigraphy recognizes that sediment rocks are deposited sequentially, one layer after the other over time. Application of chrono- and sequence stratigraphy may enable prediction of rock properties from known locations, such as at locations of wells, to unknown locations such as locations between wells and/or away from wells. In contrast with the litho-stratigraphy where the grouping of rocks is based on similar rock properties, chrono- and sequence stratigraphy enables characterization of the rocks by grouping them into generically related packages. Because the rocks within the chrono- and sequence stratigraphy are generically related, within each package, the property distributions and their spatial variations are closely related to the associated depositional processes. These depositional processes are mostly spatially continuous and may be predicted. By identifying and linking the generically related packages, a chrono- and sequence stratigraphic framework may be obtained. The framework may then be used for making predictions of related geologic properties away from the wells, as well as for building reservoir models by filling the properties in the volumes defined by the layers given by the framework.

Referring back to FIG. 1, the electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store well information, information relating to well, information relating to subsurface configuration of well, information relating to positions within well, well-marker information, information relating to marker positions within well, information relating to dissimilarity matrix, information relating to gated dissimilarity matrix, information relating to correlation between wells, information relating to correlation between marker positions within wells, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate comparing wells. The machine-readable instructions 100 may include one or more computer program components. The machine-readable instructions 100 may include one or more of a well information component 102, a well marker information component 104, a dissimilarity matrix component 106, a gated dissimilarity matrix component 108, a correlation component 110, and/or other computer program components.

The well information component 102 may be configured to obtain well information for multiple wells. Obtaining well information may include one or more of accessing, acquiring, analyzing, determining, examining, identifying, loading, locating, opening, receiving, retrieving, reviewing, selecting, storing, utilizing, and/or otherwise obtaining the well information. The well information component 102 may obtain well information from one or more locations. For example, the well information component 102 may obtain well information from a storage location, such as the electronic storage 13, electronic storage of a device accessible via a network, and/or other locations. The well information component 102 may obtain well information from one or more hardware components (e.g., a computing device, a component of a computing device) and/or one or more software components (e.g., software running on a computing device). Well information may be stored within a single file or multiple files.

The well information for a well may define subsurface configuration of the well. Subsurface configuration of a well may refer to attribute, quality, and/or characteristics of the well. Subsurface configuration of a well may refer to type, property, and/or physical arrangement of materials (e.g., subsurface elements) within the well and/or surrounding the well. Subsurface configuration of the well may be defined as a function of spatial location (e.g., vertical spatial location, lateral spatial location).

The well information for a well may include a set of values that define the subsurface configuration of the well at a set of positions within the well. A set of values may include one or more values, and a set of positions within a well may include one or more positions within the well. A position within a well may refer to a spatial location within a well. A position within a well may be defined in terms of vertical spatial location (e.g., depth) and/or lateral spatial location (e.g., x-y location).

For example, the well information component 102 may be configured to obtain first well information, second well information, and/or other well information. The first well information may define subsurface configuration of a first well. The first well information may include a set of values that define the subsurface configuration of the first well at a set of positions within the first well. The second well information may define subsurface configuration of a second well. The second well information may include a set of values that define the subsurface configuration of the second well at a set of positions within the second well.

The well information may define subsurface configuration of a well by including information that describes, delineates, identifies, is associated with, quantifies, reflects, sets forth, and/or otherwise defines one or more of content, quality, attribute, feature, and/or other aspects of the subsurface configuration of the well. For example, the well information may define subsurface configuration of a well by including information that makes up the content of the well and/or information that is used to identify/determine the content of the wells. For instance, the well information may include one or more well logs (of natural well, of virtual well), information determined/extracted from one or more well logs (e.g., of natural well, or virtual well), information determined/extracted from one or more well cores (e.g., of natural well, or virtual well), and/or other information. For example, the well information may provide information on one or more properties of a well, such as rock types, layers, grain sizes, porosity, and/or permeability of the well at different positions within the well.

In some implementations, at least one of the multiple wells (e.g., the first well and the second well) may be a natural well. For example, the first well or the second well may be a natural well. As another example, both the first well and the second well may be natural wells. A natural well may refer to a physical well. A natural well may refer to a well that exists or existed in the real world. For example, a natural well may refer to a well that is drilled in the real world. Well information for a natural well may include information extracted from the natural well. For example, well information for a natural well may include a series of values extracted from the well log and/or the core data of the well. Well information for a natural well may have $N_w$ data values, and the $j_{th}$ value may be represented as w[j], j∈[1, . . . , Nw].

In some implementations, at least one of the multiple wells (e.g., the first well and the second well) may be a virtual well. For example, the first well or the second well may be a virtual well. As another example, both the first well and the second well may be virtual wells. A virtual well may refer to a synthetic well and/or a digital well. A virtual well may refer to a well that exists or existed in a virtual world. For example, a virtual well may refer to a well that is generated using one or more computer models. A virtual well may refer to a well that is generated in one or more computer simulations. Well information for a virtual well may include information extracted from the virtual well. For example, well information for a virtual well may include a series of values extracted at a lateral spatial location in a computer-generated representation of a subsurface region. Well information for a virtual well may have $N_a$ data values, and the $i_{th}$ value may be represented as a[i], i∈[1, . . . , Na].

A computer-generated representation of a subsurface region (subsurface representation) may be representative of the depositional environment of wells (e.g., wells to be compared). A subsurface representation may include geologically plausible arrangement of rock obtained from a modeling process (e.g., stratigraphic forward modeling process). A subsurface representation may provide simulated subsurface configuration at different locations within a simulated subsurface region (e.g., provide simulated well log values at locations in a three-dimensional (x-y-z) coordinate system).

A subsurface representation may be generated using one or more subsurface models. A subsurface model may refer to a computer model (e.g., program, tool, script, function, process, algorithm) that generates subsurface representations. A subsurface model may simulate subsurface configuration within a region underneath the surface (subsurface region). Examples of subsurface configuration simulated by a subsurface model may include types of subsurface materials, characteristics of subsurface materials, compositions of subsurface materials, arrangements/configurations of subsurface materials, physics of subsurface materials, and/or other subsurface configuration.

An example of a subsurface model is a computational stratigraphy model. A computational stratigraphy model may refer to a computer model that simulates depositional and/or stratigraphic processes on a grain size scale while honoring physics-based flow dynamics. A computational stratigraphy model may simulate rock properties, such as velocity and density, based on rock-physics equations and assumptions. Input to a computational stratigraphy model may include information relating to a subsurface region to be simulated. For example, input to a computational stratigraphy model may include paleo basin floor topography, paleo flow and sediment inputs to the basin, and/or other information relating to the basin. In some implementations, input to a computational stratigraphy model may include one or more paleo geologic controls, such as climate changes, sea level changes, tectonics and other allocyclic controls. Output of a computational stratigraphy model may include one or more subsurface representations. A subsurface representation generated by a computational stratigraphy model may be referred to as a computational stratigraphy model representation.

A computational stratigraphy model may include a forward stratigraphic model. A forward stratigraphic model may be an event-based model, a process mimicking model, a reduced physics based model, and/or a fully physics based model (e.g., fully based on physics of flow and sediment transport). A forward stratigraphic model may simulate one or more sedimentary processes that recreate the way stratigraphic successions develop and/or are preserved. The forward stratigraphic model may be used to numerically reproduce the physical processes that eroded, transported, deposited and/or modified the sediments over variable time periods. In a forward modelling approach, data may not be used as the anchor points for facies interpolation or extrapolation. Rather, data may be used to test and validate the results of the simulation. Stratigraphic forward modelling may be an iterative approach, where input parameters have to be modified until the results are validated by actual data. Usage of other subsurface models and other subsurface representations are contemplated.

The well marker information component 104 may be configured to obtain well marker information for multiple wells. Obtaining well marker information may include one or more of accessing, acquiring, analyzing, determining, examining, identifying, loading, locating, opening, receiving, retrieving, reviewing, selecting, storing, utilizing, and/or otherwise obtaining the well marker information. The well marker information component 104 may obtain well marker information from one or more locations. For example, the well marker information component 104 may obtain well marker information from a storage location, such as the electronic storage 13, electronic storage of a device accessible via a network, and/or other locations. The well marker information component 104 may obtain well marker information from one or more hardware components (e.g., a computing device, a component of a computing device) and/or one or more software components (e.g., software running on a computing device). Well marker information may be stored within a single file or multiple files.

The well marker information for a well may define a set of marker positions within the well. A set of marker positions may include one or more marker positions. A marker position may refer to a position within a well (natural well, virtual well) that has been selected for comparison. A marker position may refer to a position within a well (natural well, virtual well) that has been selected for comparison to other marker positions within another well. A marker position within a well may be selected based on the subsurface configuration of the well at the corresponding position. For example, a marker position within a well may be selected based on certain rock types, layers, grain sizes, porosity, and/or permeability of the well at the corresponding position. As another example, a marker position within a well may be selected based on subsurface properties, geometry, and/or other sedimentary process information available within a subsurface representation. For instance, a marker position within a well may correspond to an important geologic boundary within the well and/or other features of interest, such as erosion, within the well.

In some implementations, a marker position within a well may be selected based on interpretation of well logs and/or analysis of seismic data. In some implementations, a marker position within a well may be selected based on interpretation and/or analysis of the corresponding subsurface configuration. For instance, a marker position may be selected based on the corresponding position (e.g., small interval) within the well including a certain number of surfaces. Other selection of marker positions are contemplated.

The well marker information for a well may define a set of marker positions within the well by including information that describes, delineates, identifies, is associated with, quantifies, reflects, sets forth, and/or otherwise defines the set of marker positions within the well. For example, the well marker information may one or more marker positions within a well by including information that specifies/identifies the marker position(s) and/or information that is used to identify/determine the marker position(s). For example, for a natural well, the well marker information may include a subset of the positions corresponding to data values of the natural well (included within well information). The subset $\mathcal{M} \subseteq [1, \ldots, N_w]$ may define the indices of the well information data values and may correspond to the marker positions within the natural well. As another example, for a virtual well, the well marker information may include a subset of the positions corresponding to data values of the virtual well (included within well information). The subset $\mathcal{V} \subseteq [1, \ldots, N_a]$ may define the indices of the well information data values and may correspond to the marker positions within the virtual well.

Figure 4:
FIG. 4 illustrates example marker positions within two wells.

For example, the well marker information component 104 may be configured to obtain first well marker information, second well marker information, and/or other well marker information. The first well marker information may define a set of marker positions within the first well. The second well marker information may define a set of marker positions within the second well. FIG. 4 illustrates example marker positions within two wells. The well marker information for a well A 410 may define marker positions 412, 414, 416 within the well A 410, and the well marker information for a well B 420 may define marker positions 422, 424, 416 within the well B 420. The marker positions 412, 414, 416 may correspond to positions (e.g., area, volume, segment, interval) that has been selected within the well A 410 for comparison to the marker positions 422, 424 within the well B 420, and vice versa.

The dissimilarity matrix component 106 may be configured to generate a dissimilarity matrix for multiple wells. A dissimilarity matrix may be generated for a pair of wells (e.g., for two natural wells, for two virtual wells, for a natural well and a virtual well). For example, the matrix component 106 may be configured to generate a dissimilarity matrix for the first well and the second well. A dissimilarity matrix may include an array of values (e.g., numbers, symbols, expressions). The values may correspond to different positions within the pair of well, and the values may characterize the extent of dissimilarity in the subsurface configuration of the corresponding positions within the pair of wells.

The dimension of the dissimilarity matrix may be characterized by a number of rows, a number of columns, and/or dimensional characteristics of the dissimilarity matrix. A dissimilarity matrix may be defined as a two-dimensional matrix. The dimension of a dissimilarity matrix may determine the number of elements within the dissimilarity matrix.

The dimension of the dissimilarity matrix may be defined by the number of positions within the individual sets of positions within the pair of wells. For example, the dimension of the dissimilarity matrix for the first well and the second well may be defined by the number of positions within the sets of positions within the first well and the number of positions within the set of positions within the second well.

Figure 5:
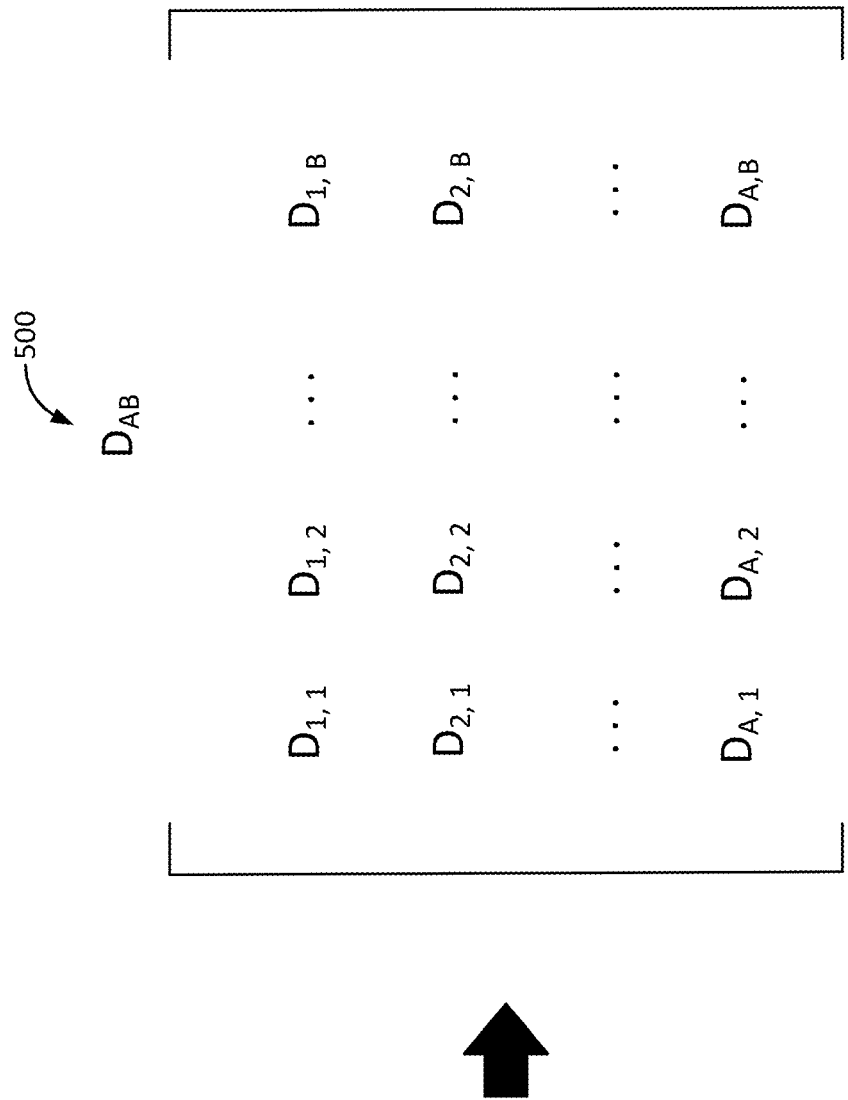
FIG. 5 illustrates an example dissimilarity matrix for a pair of wells.
Figure 5:
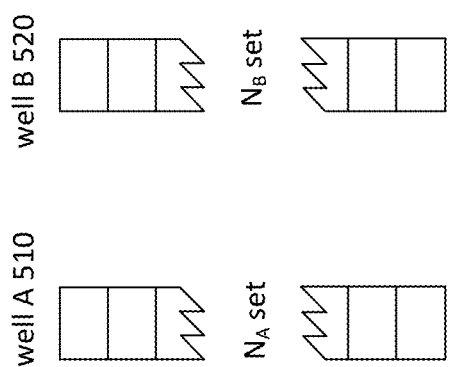

FIG. 5 illustrates an example dissimilarity matrix for a well A 510 and a well B 520. Well information for the well A 510 may define the subsurface configuration of the well A 510 at a set of positions ($N_A$ set) within the well A 510. The $N_A$ set may include A number of positions. Well information for the well B 520 may define the subsurface configuration of the well B 520 at a set of positions ($N_B$ set) within the well B 520. The $N_B$ set may include B number of positions. A dissimilarity matrix $D_{AB}$ 500 may be generated for the well A 510 and the well B 520. The dimension of the dissimilarity matrix $D_{AB}$ 500 may include a row number of A and a column number of B.

Element values of the dissimilarity matrix may be determined based on comparison of the subsurface configuration of the wells at corresponding positions within the wells, and/or other information. Element values may refer to values of elements within the cells of the dissimilarity matrix. For example, element values of the dissimilarity matrix for the first well and the second well may be determined based on comparison of the subsurface configuration of the first well at corresponding positions within the first well and the subsurface configuration of the second well at corresponding positions within second first well, and/or other information. The element values of the dissimilarity matrix may be calculated by comparing the data values of the different wells at the corresponding positions within the different wells. The element values of the dissimilarity matrix may enable comparison of subsurface configuration similarity between different positions within the wells.

In some implementations, a function of two data values a and w of the pair of wells, d(a,w), may return a dissimilarity measure reflecting the extent of dissimilarity between the corresponding positions. The element values of the dissimilarity matrix $D_{N_a \times N_w}$ may be defined such that the ith row and jth column are defined as D[i,j]=d(a[i],w[j]).

For example, the element values of the dissimilarity matrix may be determined based on quantity and/or quality of matching between the subsurface configuration of the wells at the corresponding positions. For instance, lithological comparison (e.g., using pattern recognition techniques, pattern matching techniques, lithostratigraphic analysis techniques, etc.) may be performed between the subsurface configuration of wells at corresponding positions to determine to what extent the subsurface configuration of a well at a particular position matches the subsurface configuration of a different well at a particular position.

In some implementations, the element values of the dissimilarity matrix may be determined based on the comparison of the subsurface configuration of the wells to be greater than or equal to zero. Greater element values may reflect greater dissimilarity between the subsurface configuration of the wells at corresponding position within the wells.

Figure 6:
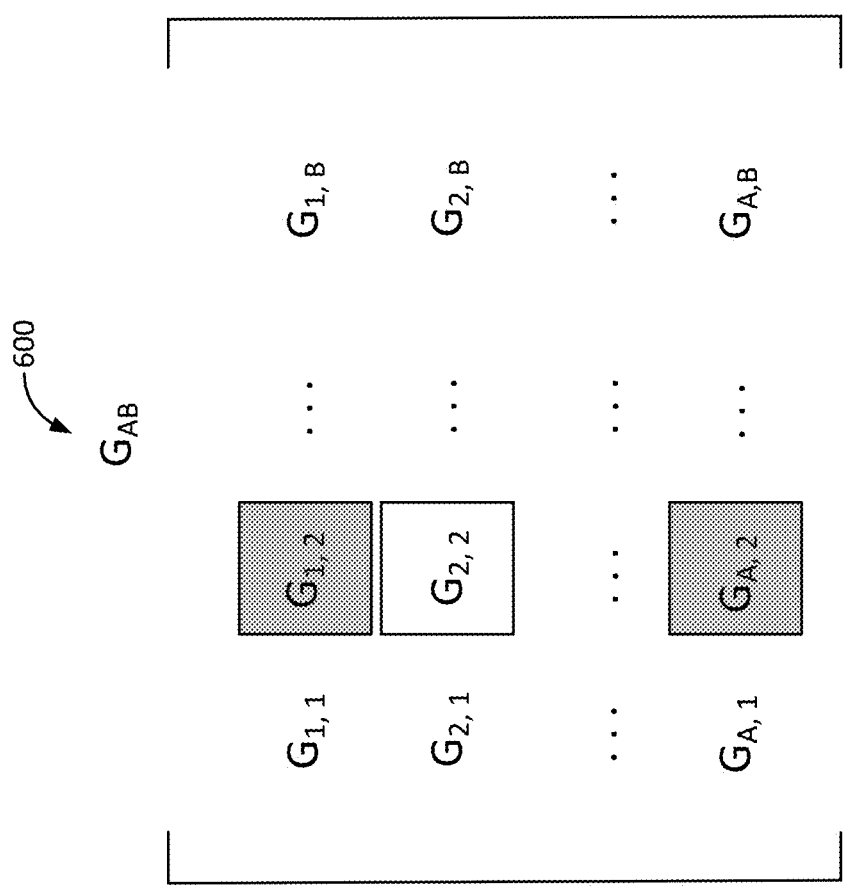
FIG. 6 illustrates an example gated dissimilarity matrix for a pair of wells.

The gated dissimilarity matrix component 108 may be configured to generate a gated dissimilarity matrix from a dissimilarity matrix. For example, the gated dissimilarity matrix component 108 may be configured to generate a gated dissimilarity matrix for the first well and the second well from the dissimilarity matrix for the first well and the second well. A gated dissimilarity matrix may include an array of values. The dimension of the gated dissimilarity matrix may be the same as the dimension of the dissimilarity matrix. For example, FIG. 6 illustrates an example gated dissimilarity matrix $G_{AB}$ 600 for the well A 510 and the well B 520. The gated dissimilarity matrix $G_{AB}$ 600 may be generated from the dissimilarity matrix $D_{AB}$ 500.

A gated dissimilarity matrix may be generated based on the set of marker positions within different wells, and/or other information. For example, the gated dissimilarity matrix for the first well and the second well may be generated based on the set of marker positions within the first well, the set of marker positions within the second well, and/or other information. The element values of the gated dissimilarity matrix may be determined based on the element values of the dissimilarity matrix. One or more element values of the gated dissimilarity matrix may be same as the corresponding element value(s) of the dissimilarity matrix. One or more element values of the gated dissimilarity matrix may be changed from the corresponding element value(s) of the dissimilarity matrix.

For example, the element values of the dissimilarity matrix corresponding to the set of marker positions within one well (e.g., the first well) and not corresponding to the set of marker positions within the other well (e.g., the second well) may be changed relative to other element values in the gated dissimilarity matrix. The element values may be directly changed relative to other elements values by changing the element values. The element values may be indirectly changed relative to other elements values by changing the other element values. The element values may be changed relative to other element values in the gated dissimilarity matrix to control how correlation between the wells are determined. The element values may be changed relative to other element values in the gated dissimilarity matrix to ensure that a marker position in one well is correlated to a marker position in the other well. Thus, the gated dissimilarity matrix may be generated to require correlation between the wells to be determined such that marker positions in one well are correlated to marker positions in the other well.

In some implementations, the element values corresponding to the set of marker positions within one well (e.g., the first well) and not corresponding to the set of marker positions within the other well (e.g., the second well) may be changed relative to the other element values by increasing the element values to infinity. The other element values of the gated dissimilarity matrix may be the same as the dissimilarity matrix. Such element value determination for the gated dissimilarity matrix may be represented as $G[i,j]=D[i,j]$ $\forall i \notin \mathcal{V} \Omega j \in \mathcal{M}$, $\infty$ otherwise. The element values corresponding to the set of marker positions within one well (e.g., the first well) and not corresponding to the set of marker positions within the other well (e.g., the second well) may be changed to prevent traversal of a path for determining correlation between the wells. On the other hand, the element values corresponding to the sets of marker positions within both wells (corresponding to the set of marker positions within one well (e.g., the first well) and corresponding to the set of marker positions within the other well (e.g., the second well)) may be preserved to allow traversal of the path for determining correlation between the wells.

For example, referring to FIG. 6, gated dissimilarity matrix $G_{AB}$ 600 may include cells corresponding to different pairs of positions within the wells well A 510 and the well B 520. The cells $G_{1,2}$ and $G_{A,2}$ may correspond to marker positions within only one of the well A 510 and the well B 520. The cell $G_{2,2}$ may correspond to a marker position within both of the well A 510 and the well B 520. The element value of the cell $G_{2,2}$ may be the same as the element value of the cell $D_{2,2}$. The element values of the cells $G_{1,2}$ and $G_{A,2}$ may be set to infinity. Such change in and/or setting of the element values may prevent the path for determining correlation between the well A 510 and the well B 520 from traversing through the cells $G_{1,2}$ and $G_{A,2}$, while allowing traversal of the path through the cell $G_{2,2}$ when traversing across the second column.

In some implementations, the element values corresponding to the set of marker positions within one well (e.g., the first well) and not corresponding to the set of marker positions within the other well (e.g., the second well) may be indirectly changed relative to other element values by changing the other element values. For example, the element values corresponding to the sets of marker positions within both wells may be changed to require certain traversal of the path for determining correlation between the wells. For example, referring to FIG. 6, the element value of the cell $G_{2,2}$ may be changed to require the path for determining correlation between the well A 510 and the well B 520 to travel through the cell $G_{2,2}$ when traversing across the second column.

The correlation component 110 may be configured to determine correlation between different wells based on the gated dissimilarity matrix and/or other information. The element values of the gated dissimilarity matrix may be used to determine the correlation between the wells. The correlation between the different wells may be determined deterministically and/or probabilistically based on the element values of the gated dissimilarity matrix.

The correlation determined between different wells may include correlation between marker positions within the different wells. For example, the correlation component 110 may be configured to determine correlation between the first well and the second well based on the gated dissimilarity matrix for the first well and the second well, and/or other information. The correlation component 110 may be configured to determine correlation between one or more marker positions within the first well and one or more marker positions within the second well based on the gated dissimilarity matrix for the first well and the second well, and/or other information. That is, correlation may be determined based on the gated dissimilarity matrix so that a marker position within the first well is correlation with a marker position within the second well.

In some implementations, determination of the correlation between the marker position(s) within the first well and the marker position(s) within the second well based on the gated dissimilarity matrix may include generation of one or more paths within the gated dissimilarity matrix. A path may be generated based on a directed walk within the gated dissimilarity matrix and/or other information. A path may represent a scenario of correlation between positions within the different wells. For example, a path may represent a scenario of correlation between position within first well and positions within the second well. In some implementations, a path may include a minimum-cost path. The minimum-cost path may be determined based on a dynamic warping algorithm. For example, the following dynamic time warping algorithm (DTW) and cost function ($C_p$) may be used to determine the minimum-cost path:

$$DTW(\overline{X}, \overline{Y}) = \min_{p \in \{Set \ of \ Valid \ Paths\}} (C_p(\overline{X}, \overline{Y}))$$

$$C_p(\overline{X}, \overline{Y}) = \sum_{i=1}^{L} |X[n_i] - Y[m_i]|$$

Figure 7:
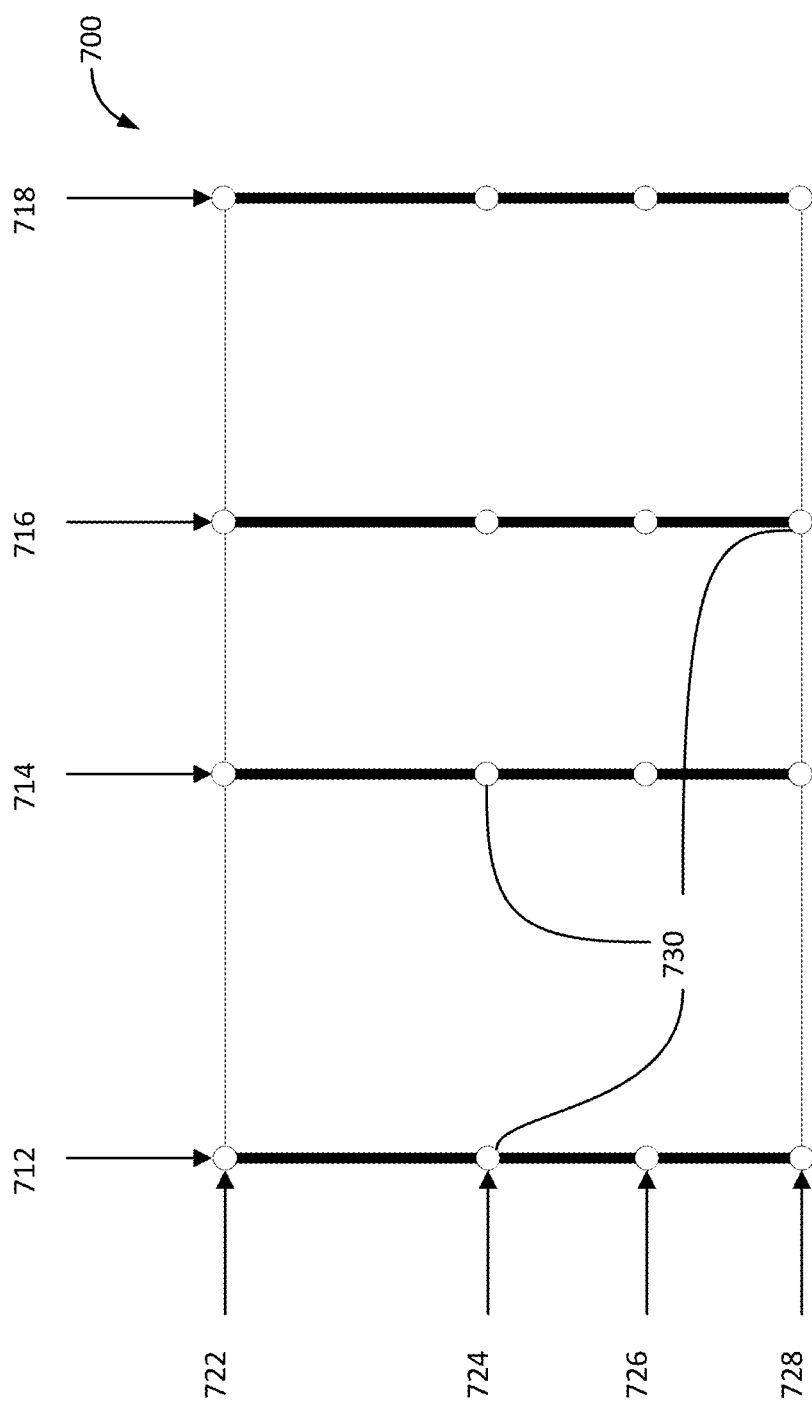
FIG. 7 illustrates an example representation of a gated dissimilarity matrix for a pair of wells.

The element values of the gated dissimilarity matrix may limit and/or restrict how the path may traverse across the gated dissimilarity matrix. For example, FIG. 7 illustrates an example representation 700 of a gated dissimilarity matrix for a pair of wells. The representation 700 may include columns 712, 714, 716, 718 corresponding to marker positions within one well and rows 722, 724, 726, 728 corresponding to marker position within the other well. The one or more values of the representation 700 along the columns 712, 714, 716, 718 may be changed to prevent and/or allow traversal of the path. For example, the element values corresponding to the set of marker positions within one well (e.g., the first well) and not corresponding to the set of marker positions within the other well (e.g., the second well) may be changed relative to the other element values to obstruct traversal of the path through corresponding elements of the gated dissimilarity matrix.

For example, for a minimum-cost path, the values of the representation 700 along the columns 712, 714, 716, 718 that do not cross with the rows 722, 724, 726, 728 may be changed to infinity, thereby preventing transversal of the minimum-cost path through those points. The values of the representation 700 along the columns 712, 714, 716, 718 that crosses with the rows 722, 724, 726, 728 may be preserved, thereby allowing traversal of the path through those points. The points not allowing traversal of path may be shown as dark lines in the representation 700. The dark lines correspond to walls that block the traversal of the path. The points allowing traversal of path may be shown as open circles 730 in the representation 700. The open circles 730 may correspond to gates through which the path may traveling in determining correlation between the different wells. Thus, correlation determined between the two wells may include linkage between marker positions in one well and marker positions in the other well. In some implementation, use of a sub-sequence dynamic warping algorithm may result in up to $|\mathcal{V}|-|\mathcal{M}|+1$ sub-segment similarity measures and detailed correlations. Other changes in element values and other types of paths are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
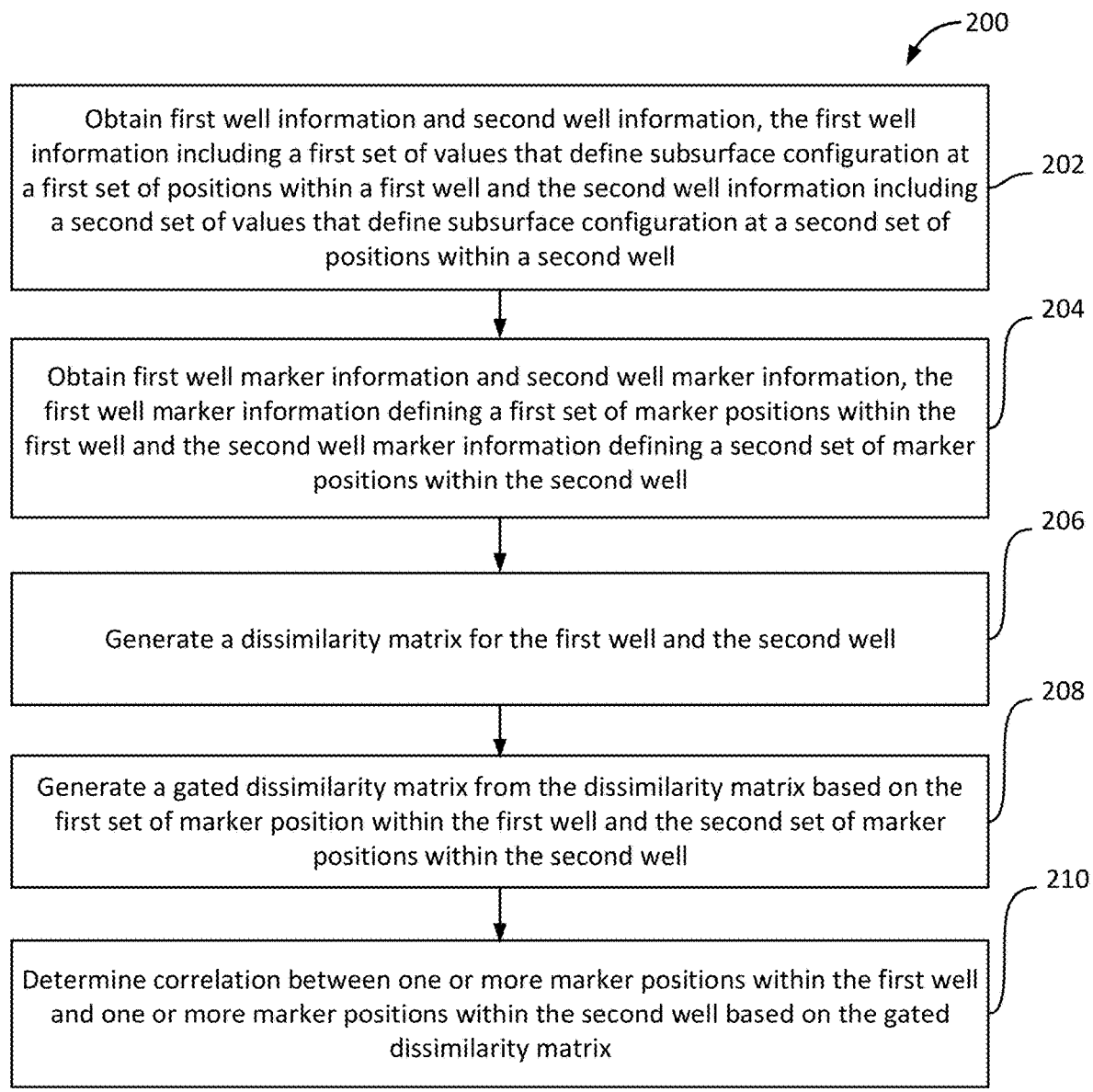
FIG. 2 illustrates an example method for comparing wells.

FIG. 2 illustrates method 200 for comparing wells. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 202, first well information, second well information, and/or other information may be obtained. The first well information may define subsurface configuration of a first well. The first well information may include a first set of values that define the subsurface configuration at a first set of positions within the first well. The second well information may define the subsurface configuration of a second well. The second well information may include a second set of values that define the subsurface configuration at a second set of positions within the second well. In some implementation, operation 202 may be performed by a processor component the same as or similar to the well information component 102 (Shown in FIG. 1 and described herein).

At operation 204, first well marker information, second well marker information, and/or other information may be obtained. The first well marker information may define a first set of marker positions within the first well. The second well marker information may define a second set of marker positions within the second well. In some implementation, operation 204 may be performed by a processor component the same as or similar to the well marker information component 104 (Shown in FIG. 1 and described herein).

At operation 206, a dissimilarity matrix for the first well and the second well may be generated. A dimension of the dissimilarity matrix may be defined by a first number of positions within the first set of positions and a second number of positions within the second set of positions. Element values of the dissimilarity matrix may be determined based on comparison of the subsurface configuration of the first well at corresponding positions within the first well and the subsurface configuration of the second well at corresponding positions within second first well, and/or other information. In some implementation, operation 206 may be performed by a processor component the same as or similar to the dissimilarity matrix component 106 (Shown in FIG. 1 and described herein).

At operation 208, a gated dissimilarity matrix may be generated from the dissimilarity matrix based on the first set of marker positions within the first well, the second set of marker positions within the second well, and/or other information. The element values of the dissimilarity matrix corresponding to the first set of marker positions and not corresponding to the second set of marker positions within the second well may be changed relative to other element values in the gated dissimilarity matrix. In some implementation, operation 208 may be performed by a processor component the same as or similar to the gated dissimilarity matrix component 108 (Shown in FIG. 1 and described herein).

At operation 210, correlation between one or more marker positions within the first well and one or more marker positions within the second well may be determined based on the gated dissimilarity matrix and/or other information. In some implementation, operation 210 may be performed by a processor component the same as or similar to the correlation component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for comparing wells, the system comprising:
one or more physical processors configured by machine-readable instructions to:
obtain first well information, the first well information defining subsurface configuration of a first well, the first well information including a first set of values that define the subsurface configuration of the first well at a first set of positions within the first well;
obtain second well information, the second well information defining subsurface configuration of a second well, the second well information including a second set of values that define the subsurface configuration of the second well at a second set of positions within the second well;
obtain first well marker information, the first well marker information defining a first set of marker positions within the first well;
obtain second well marker information, the second well marker information defining a second set of marker positions within the second well;
generate a dissimilarity matrix for the first well and the second well, a dimension of the dissimilarity matrix defined by a first number of positions within the first set of positions and a second number of positions within the second set of positions, wherein element values of the dissimilarity matrix are determined based on comparison of the subsurface configuration of the first well at corresponding positions within the first well and the subsurface configuration of the second well at corresponding positions within second first well;
generate a gated dissimilarity matrix from the dissimilarity matrix to control how correlation between different wells are determined, the gated dissimilarity matrix determined based on the first set of marker positions within the first well and the second set of marker positions within the second well, wherein the element values of the dissimilarity matrix corresponding to the first set of marker positions and not corresponding to the second set of marker positions within the second well are changed relative to other element values in the gated dissimilarity matrix; and
determine correlation between one or more marker positions within the first well and one or more marker positions within the second well based on the gated dissimilarity matrix, wherein determination of the correlation between a given marker position within the first well and a given marker position within the second well includes identification of connection between corresponding segments of the first well and the second well.

2. The system of claim 1, wherein at least one of the first well and the second well is a natural well or a virtual well.

3. The system of claim 1, wherein the element values of the dissimilarity matrix are determined based on the comparison to be greater than or equal to zero, greater element values reflecting greater dissimilarity.

4. The system of claim 3, wherein determination of the correlation between the one or more marker positions within the first well and the one or more marker positions within the second well based on the gated dissimilarity matrix includes generation of a path within the gated dissimilarity matrix based on a directed walk within the gated dissimilarity matrix, and the element values corresponding to the first set of marker positions and not corresponding to the second set of marker positions within the second well are changed relative to the other element values to obstruct traversal of the path through corresponding elements of the gated dissimilarity matrix.

5. The system of claim 4, wherein the path includes a minimum-cost path.

6. The system of claim 4, wherein the path represents a scenario of correlation between positions within the first well and positions within the second well.

7. The system of claim 4, wherein the element values corresponding to the first set of marker positions within the first well and not corresponding to the second set of marker positions within the second well are changed relative to the other element values by increasing the element values to infinity.

8. The system of claim 4, wherein the element values corresponding to the first set of marker positions within the first well and corresponding to the second set of marker positions within the second well are preserved to allow traversal of the path.

9. The system of claim 1, wherein the element values corresponding to the first set of marker positions within the first well and not corresponding to the second set of marker positions within the second well are indirectly changed relative to other element values by changing the other element values.

10. The system of claim 1, wherein the identification of the connection between the corresponding segments of the first well and the second well includes identification of the corresponding segments of the first well and the second well as (1) having been deposited at same time, or (2) having similar or related characteristics.

11. A method for comparing wells, the method comprising:
   obtaining first well information, the first well information defining subsurface configuration of a first well, the first well information including a first set of values that define the subsurface configuration of the first well at a first set of positions within the first well;
   obtaining second well information, the second well information defining subsurface configuration of a second well, the second well information including a second set of values that define the subsurface configuration of the second well at a second set of positions within the second well;
   obtaining first well marker information, the first well marker information defining a first set of marker positions within the first well;
   obtaining second well marker information, the second well marker information defining a second set of marker positions within the second well;
   generating a dissimilarity matrix for the first well and the second well, a dimension of the dissimilarity matrix defined by a first number of positions within the first set of positions and a second number of positions within the second set of positions, wherein element values of the dissimilarity matrix are determined based on comparison of the subsurface configuration of the first well at corresponding positions within the first well and the subsurface configuration of the second well at corresponding positions within second first well;
   generating a gated dissimilarity matrix from the dissimilarity matrix to control how correlation between different wells are determined, the gated dissimilarity matrix determined based on the first set of marker positions within the first well and the second set of marker positions within the second well, wherein the element values of the dissimilarity matrix corresponding to the first set of marker positions and not corresponding to the second set of marker positions within the second well are changed relative to other element values in the gated dissimilarity matrix; and
   determining correlation between one or more marker positions within the first well and one or more marker positions within the second well based on the gated dissimilarity matrix, wherein determining the correlation between a given marker position within the first well and a given marker position within the second well includes identifying connection between corresponding segments of the first well and the second well.

12. The method of claim 11, wherein at least one of the first well and the second well is a natural well or a virtual well.

13. The method of claim 11, wherein the element values of the dissimilarity matrix are determined based on the comparison to be greater than or equal to zero, greater element values reflecting greater dissimilarity.

14. The method of claim 13, wherein determining the correlation between the one or more marker positions within the first well and the one or more marker positions within the second well based on the gated dissimilarity matrix includes generating a path within the gated dissimilarity matrix based on a directed walk within the gated dissimilarity matrix, and the element values corresponding to the first set of marker positions and not corresponding to the second set of marker positions within the second well are changed relative to the other element values to obstruct traversal of the path through corresponding elements of the gated dissimilarity matrix.

15. The method of claim 14, wherein the path includes a minimum-cost path.

16. The method of claim 14, wherein the path represents a scenario of correlation between positions within the first well and positions within the second well.

17. The method of claim 14, wherein the element values corresponding to the first set of marker positions within the first well and not corresponding to the second set of marker positions within the second well are changed relative to the other element values by increasing the element values to infinity.

18. The method of claim 14, wherein the element values corresponding to the first set of marker positions within the first well and corresponding to the second set of marker positions within the second well are preserved to allow traversal of the path.

19. The method of claim 11, wherein the element values corresponding to the first set of marker positions within the first well and not corresponding to the second set of marker positions within the second well are indirectly changed relative to other element values by changing the other element values.

20. The method of claim 11, wherein identifying the connection between the corresponding segments of the first well and the second well includes identifying the corresponding segments of the first well and the second well as (1) having been deposited at same time, or (2) having similar or related characteristics.

* * * * *